(12) United States Patent
Yancey et al.

(10) Patent No.: US 9,411,852 B2
(45) Date of Patent: *Aug. 9, 2016

(54) TECHNIQUES FOR PROCESSING GROUP MEMBERSHIP DATA IN A MULTI-TENANT DATABASE SYSTEM

(71) Applicant: salesforce.com, inc., San Francisco, CA (US)

(72) Inventors: Scott Yancey, San Francisco, CA (US); Kedar Doshi, Palo Alto, CA (US); Yongsheng Wu, Emeryville, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/916,441

(22) Filed: Jun. 12, 2013

(65) Prior Publication Data

US 2013/0346389 A1  Dec. 26, 2013

Related U.S. Application Data

(63) Continuation of application No. 12/167,991, filed on Jul. 3, 2008, now Pat. No. 8,473,518.

(51) Int. Cl.
*G06F 17/30* (2006.01)
*G06F 21/60* (2013.01)

(52) U.S. Cl.
CPC .... *G06F 17/30442* (2013.01); *G06F 17/30165* (2013.01); *G06F 17/30289* (2013.01); *G06F 21/604* (2013.01)

(58) Field of Classification Search
None
See application file for complete search history.

(56) References Cited

U.S. PATENT DOCUMENTS

| | | | |
|---|---|---|---|
| 5,072,337 A | 12/1991 | Durdik | |
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,787,437 A | 7/1998 | Potterveld et al. | |
| 5,794,232 A | 8/1998 | Mahlum et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |

(Continued)

FOREIGN PATENT DOCUMENTS

WO    WO 2004059420    7/2004

OTHER PUBLICATIONS

First named inventor: Yancey, Scott, U.S. Appl. No. 12/132,409, filed Jun. 3, 2008.

(Continued)

*Primary Examiner* — Bai D. Vu
(74) *Attorney, Agent, or Firm* — Blakely Sokoloff Taylor & Zafman LLP

(57) ABSTRACT

In accordance with embodiments, there are provided techniques for processing group membership data in a multi-tenant database system. These techniques for processing group membership data in a multi-tenant database system may enable embodiments to provide great flexibility to a tenant of the architecture to select the content that may be perceived by the tenant users while allowing the owner of the architecture control over the content.

20 Claims, 7 Drawing Sheets

(56) References Cited

U.S. PATENT DOCUMENTS

| | | |
|---|---|---|
| 5,941,947 A | 8/1999 | Brown et al. |
| 5,950,190 A | 9/1999 | Yeager et al. |
| 5,963,953 A | 10/1999 | Cram et al. |
| 5,974,409 A | 10/1999 | Sanu et al. |
| 5,987,471 A | 11/1999 | Bodine et al. |
| 6,064,656 A | 5/2000 | Angal et al. |
| 6,085,191 A | 7/2000 | Fisher et al. |
| 6,092,083 A | 7/2000 | Brodersen et al. |
| 6,112,198 A | 8/2000 | Lohman et al. |
| 6,169,534 B1 | 1/2001 | Raffel et al. |
| 6,178,425 B1 | 1/2001 | Brodersen et al. |
| 6,189,000 B1 | 2/2001 | Gwertzman et al. |
| 6,189,011 B1 | 2/2001 | Lim et al. |
| 6,216,135 B1 | 4/2001 | Brodersen et al. |
| 6,219,667 B1 | 4/2001 | Lu et al. |
| 6,226,641 B1 | 5/2001 | Hickson et al. |
| 6,233,617 B1 | 5/2001 | Rothwein et al. |
| 6,233,618 B1 | 5/2001 | Shannon |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,330,560 B1 | 12/2001 | Harrison et al. |
| 6,336,137 B1 | 1/2002 | Lee et al. |
| 6,341,288 B1 | 1/2002 | Yach et al. |
| 6,345,288 B1 | 2/2002 | Reed et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,438,562 B1 | 8/2002 | Gupta et al. |
| 6,446,089 B1 | 9/2002 | Brodersen et al. |
| 6,446,109 B2 | 9/2002 | Gupta |
| 6,453,038 B1 | 9/2002 | McFarlane et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,578,037 B1 | 6/2003 | Wong et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,148 B1 | 8/2003 | Salo et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,658,417 B1 | 12/2003 | Stakutis et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,721,765 B2 | 4/2004 | Ghosh et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,839,608 B2 | 1/2005 | Sarabi et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,944,133 B2 | 9/2005 | Wisner et al. |
| 6,947,927 B2 | 9/2005 | Chaudhuri et al. |
| 7,076,633 B2 | 7/2006 | Tormasov et al. |
| 7,152,109 B2 | 12/2006 | Suorsa et al. |
| 7,185,192 B1 | 2/2007 | Kahn |
| 7,206,805 B1 | 4/2007 | McLaughlin, Jr. |
| 7,206,807 B2 | 4/2007 | Cheenath |
| 7,209,929 B2 | 4/2007 | Dominguez, Jr. et al. |
| 7,249,118 B2 | 7/2007 | Sandler et al. |
| 7,305,577 B2 | 12/2007 | Zhang |
| 7,308,704 B2 | 12/2007 | Vogel et al. |
| 7,340,411 B2 | 3/2008 | Cook |
| 7,350,237 B2 | 3/2008 | Vogel et al. |
| 7,373,364 B1 | 5/2008 | Chapman |
| 7,448,079 B2 | 11/2008 | Tremain |
| 7,484,219 B2 | 1/2009 | Mitra |
| 7,577,092 B2 | 8/2009 | San Andres et al. |
| 7,580,975 B2 | 8/2009 | Cheenath |
| 7,599,953 B2 | 10/2009 | Galindo-Legaria et al. |
| 7,620,655 B2 | 11/2009 | Larsson et al. |
| 7,693,820 B2 | 4/2010 | Larson et al. |
| 7,774,366 B2 | 8/2010 | Fisher |
| 7,814,470 B2 | 10/2010 | Mamou et al. |
| 7,849,401 B2 | 12/2010 | Elza et al. |
| 8,015,019 B1* | 9/2011 | Smith et al. .................... 705/1.1 |
| 8,146,155 B1* | 3/2012 | Todd et al. ....................... 726/21 |
| 8,244,759 B2 | 8/2012 | Brooks et al. |
| 8,296,321 B2 | 10/2012 | Durdik et al. |
| 8,443,366 B1 | 5/2013 | Yancey |
| 8,473,469 B1 | 6/2013 | Yancey et al. |
| 8,776,067 B1 | 7/2014 | Yancey |
| 8,972,431 B2 | 3/2015 | Press et al. |
| 8,977,675 B2 | 3/2015 | Tanaka |
| 2001/0023440 A1 | 9/2001 | Franklin et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0133392 A1 | 9/2002 | Angel et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015578 A1 | 1/2004 | Karakashian et al. |
| 2004/0015981 A1 | 1/2004 | Coker et al. |
| 2004/0027388 A1 | 2/2004 | Berg et al. |
| 2004/0044656 A1 | 3/2004 | Cheenath |
| 2004/0045004 A1 | 3/2004 | Cheenath |
| 2004/0064503 A1 | 4/2004 | Karakashian et al. |

(56) References Cited

U.S. PATENT DOCUMENTS

| | | |
|---|---|---|
| 2004/0078371 A1 | 4/2004 | Worrall et al. |
| 2004/0111410 A1 | 6/2004 | Burgoon et al. |
| 2004/0128001 A1 | 7/2004 | Levin et al. |
| 2004/0143645 A1 | 7/2004 | Cheenath |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0205355 A1* | 10/2004 | Boozer et al. ............... 713/200 |
| 2004/0220952 A1 | 11/2004 | Cheenath |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0102154 A1* | 5/2005 | Dodd et al. ..................... 705/1 |
| 2005/0125725 A1* | 6/2005 | Gatt ............................... 715/517 |
| 2005/0223022 A1 | 10/2005 | Weissman et al. |
| 2005/0283478 A1 | 12/2005 | Choi et al. |
| 2006/0095960 A1 | 5/2006 | Arregoces et al. |
| 2006/0100912 A1 | 5/2006 | Kumar et al. |
| 2006/0112052 A1* | 5/2006 | Jeanblanc et al. ............. 706/46 |
| 2006/0136382 A1 | 6/2006 | Dettinger et al. |
| 2006/0206834 A1 | 9/2006 | Fisher et al. |
| 2007/0078705 A1 | 4/2007 | Abels et al. |
| 2007/0088741 A1 | 4/2007 | Brooks et al. |
| 2007/0124276 A1* | 5/2007 | Weissman et al. ............... 707/2 |
| 2007/0130130 A1 | 6/2007 | Chan et al. |
| 2007/0130137 A1 | 6/2007 | Oliver et al. |
| 2007/0150303 A1 | 6/2007 | Cheenath |
| 2007/0150546 A1 | 6/2007 | Karakashian et al. |
| 2007/0226640 A1 | 9/2007 | Holbrook et al. |
| 2008/0010243 A1 | 1/2008 | Weissman et al. |
| 2008/0066185 A1* | 3/2008 | Lester et al. .................... 726/27 |
| 2008/0077566 A1 | 3/2008 | Fell et al. |
| 2008/0082540 A1* | 4/2008 | Weissman et al. ............... 707/9 |
| 2008/0082555 A1 | 4/2008 | Salmon et al. |
| 2008/0082572 A1 | 4/2008 | Ballard et al. |
| 2008/0082986 A1 | 4/2008 | Cheenath et al. |
| 2008/0086358 A1 | 4/2008 | Doshi et al. |
| 2008/0086447 A1 | 4/2008 | Weissman et al. |
| 2008/0086479 A1 | 4/2008 | Fry et al. |
| 2008/0086482 A1 | 4/2008 | Weissman |
| 2008/0086514 A1 | 4/2008 | Weissman et al. |
| 2008/0086567 A1 | 4/2008 | Langen et al. |
| 2008/0086735 A1 | 4/2008 | Cheenath et al. |
| 2008/0112405 A1* | 5/2008 | Cholas et al. .................. 370/389 |
| 2008/0126333 A1 | 5/2008 | Bezar et al. |
| 2008/0155310 A1 | 6/2008 | Langen et al. |
| 2008/0162544 A1 | 7/2008 | Weissman et al. |
| 2008/0201701 A1 | 8/2008 | Hofhansl et al. |
| 2008/0215560 A1 | 9/2008 | Bell et al. |
| 2008/0269167 A1 | 10/2008 | Ziegler et al. |
| 2008/0270354 A1 | 10/2008 | Weissman |
| 2008/0270987 A1 | 10/2008 | Weissman |
| 2009/0030906 A1 | 1/2009 | Doshi et al. |
| 2009/0049065 A1 | 2/2009 | Weissman |
| 2009/0049101 A1 | 2/2009 | Weissman |
| 2009/0049102 A1 | 2/2009 | Weissman |
| 2009/0049288 A1 | 2/2009 | Weissman |
| 2009/0276395 A1 | 11/2009 | Weissman et al. |
| 2009/0276405 A1 | 11/2009 | Weissman et al. |
| 2009/0282045 A1 | 11/2009 | Hsieh et al. |
| 2009/0319529 A1 | 12/2009 | Bartlett et al. |
| 2010/0017374 A1* | 1/2010 | Bae et al. ......................... 707/3 |
| 2010/0191719 A1 | 7/2010 | Weissman et al. |
| 2010/0211619 A1 | 8/2010 | Weissman et al. |
| 2010/0235837 A1 | 9/2010 | Weissman et al. |
| 2010/0274779 A1 | 10/2010 | Weissman et al. |
| 2011/0078213 A1 | 3/2011 | Bezar et al. |
| 2011/0234482 A1 | 9/2011 | Tanaka |
| 2011/0238736 A1 | 9/2011 | Tanaka |
| 2011/0276535 A1 | 11/2011 | Pin et al. |
| 2011/0276834 A1 | 11/2011 | Calahan et al. |
| 2012/0047489 A1 | 2/2012 | Varadharajan |
| 2014/0095545 A1* | 4/2014 | Weissman et al. ............ 707/783 |

OTHER PUBLICATIONS

First named inventor: Durdik, Paul, U.S. Appl. No. 12/549,349, filed Aug. 27, 2009.

[Online];[published on Oct. 17, 2008];[retrieved on Feb. 26, 2010]; retrieved from http://en.wikipedia.orglwiki/ Push_technology.

[Online];[published on Oct. 16, 2008];[retrieved on Feb. 26, 2010]; retrieved from http://en.wikipedia.org/wiki/ Customer_Relationship_Management.

[Online];[published on Apr. 22, 2008];[retrieved on Feb. 26, 2010]; retrieved from http://en.wikipedia.org/wiki/ flat_file_database.

[Online]; published on Apr. 25, 2008; retrieved on Feb. 26, 2010; retrieved from http://en.wikipedia.org/wiki/ relational_database.

Notification of Transmittal of the International Search Report and the Written Opinion of the International Searching Authority, or the Declaration. International Application No.: PCT/US2010/1050021. International Filing Date: Sep. 23, 2010.

Wang et al: "A Study and Performance Evaluation of the Multi-Tenant Data Tier Design Patterns for Service Oriented Computing", IEE International Conference on E-Business Engineering, NJ, USA, Oct. 22, 2008, pp. 94-101.

Wermelinger et al: "Using coordination contracts for flexible adaptation to changing business rules", Proceedings of the Sixth International Workshop on Software Evolution, NJ, USA, Sep. 1, 2003, pp. 115-120.

Lee et al: "Composition of executable business process models by combining business rules and process flows", Expert Systems With Application, Oxford, GB, vol. 33, No. 1, Dec. 22, 2006, pp. 221-229.

Mietzer et al: "Combining Different Multi-tenancy Patterns in Service Oriented Applications", IEE International Enterprise Distributed Object Computing Conference, NJ, USA, Sep. 1, 2009, pp. 131-140.

Wang et al: "Integrated Constraint Violation Handling for Dynamic Services Composition", IEE International Conference on Services Computing, NJ, USA, Sep. 21, 2009, pp. 168-175.

Office Action for U.S. Appl. No. 12/167,991 dated Jan. 3, 2011, 19 pages.

Office Action for U.S. Appl. No. 12/167,991 dated Jun. 23, 2011, 18 pages.

Office Action for U.S. Appl. No. 12/167,991 dated May 9, 2012, 17 pages.

Office Action for U.S. Appl. No. 12/167,991 dated Dec. 17, 2012, 20 pages.

Notice of Allowance for U.S. Appl. No. 12/167,991 dated May 15, 2013, 9 pages.

\* cited by examiner

TECHNIQUES FOR PROCESSING GROUP MEMBERSHIP DATA IN A MULTI-TENANT DATABASE SYSTEM

CLAIM OF PRIORITY

This continuation application is related to, and claims priority to, the utility application entitled "TECHNIQUES FOR PROCESSING GROUP MEMBERSHIP DATA IN A MULTI-TENANT DATABASE SYSTEM," filed on Jul. 3, 2008, having an application Ser. No. of 12/167,991, now U.S. Pat. No. 8,473,518, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to processing query statements on a multi-tenant on demand architecture in a database network system.

BACKGROUND

The subject matter discussed in the background section should not be assumed to be prior art merely as a result of its mentioned in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and sent to the user system information relevant to the request. The efficient retrieval of accurate information and subsequent delivery of this information to the user system has been and continues to be a goal of database systems.

Unfortunately, conventional database approaches might become inefficient if, for example, updating applications in the presence of complex data structures. A database system may also process a query relatively slowly if, for example, a relatively large number of users substantially concurrently access the database system. Accordingly, it is desirable to provide techniques enabling an owner of the database system to improve the ease of use of the database system.

BRIEF SUMMARY

In accordance with embodiments, there are provided techniques for processing group membership data in a multi-tenant database system. These mechanisms and methods for processing group membership data in a multi-tenant database system can enable embodiments to ease the burden of manipulation data when updating the database. It may also reduce the processing cycles required to process queries to the database.

In an embodiment and by way of example, a method of processing group membership data in a multi-tenant database system includes receiving a request for access to a sub-portion of content on the database system. The request has requester identification data. Groups are identified that have access to the sub-portion. Data stored on the database in first and second sets system is joined to identify member information associated with the groups. It is determined whether the requester identification data corresponds to the member information; and access is granted to the sub-portion in response to determining that the requester identification data corresponding to the member information.

The present invention is described with reference to an embodiment in which an apparatus processes group membership data in a multi-tenant on demand architecture. The application server provides a front end for an on-demand database service capable of supporting multiple tenants; the present invention is not limited to multi-tenant database systems nor deployment on application servers. Embodiments may be practiced using other database architectures, i.e., ORACLE®, DB2C® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Systems and methods are provided for processing group membership data in a multitenant database system. As used herein, the term multi-tenant database system (MTS) refers to those systems in which various elements of hardware and software of the database system may be shared by one or more users. For example, a given application server may simultaneously process requests for a great number of customers, and a given database table may store rows for a potentially much greater number of customers.

Figure 1:
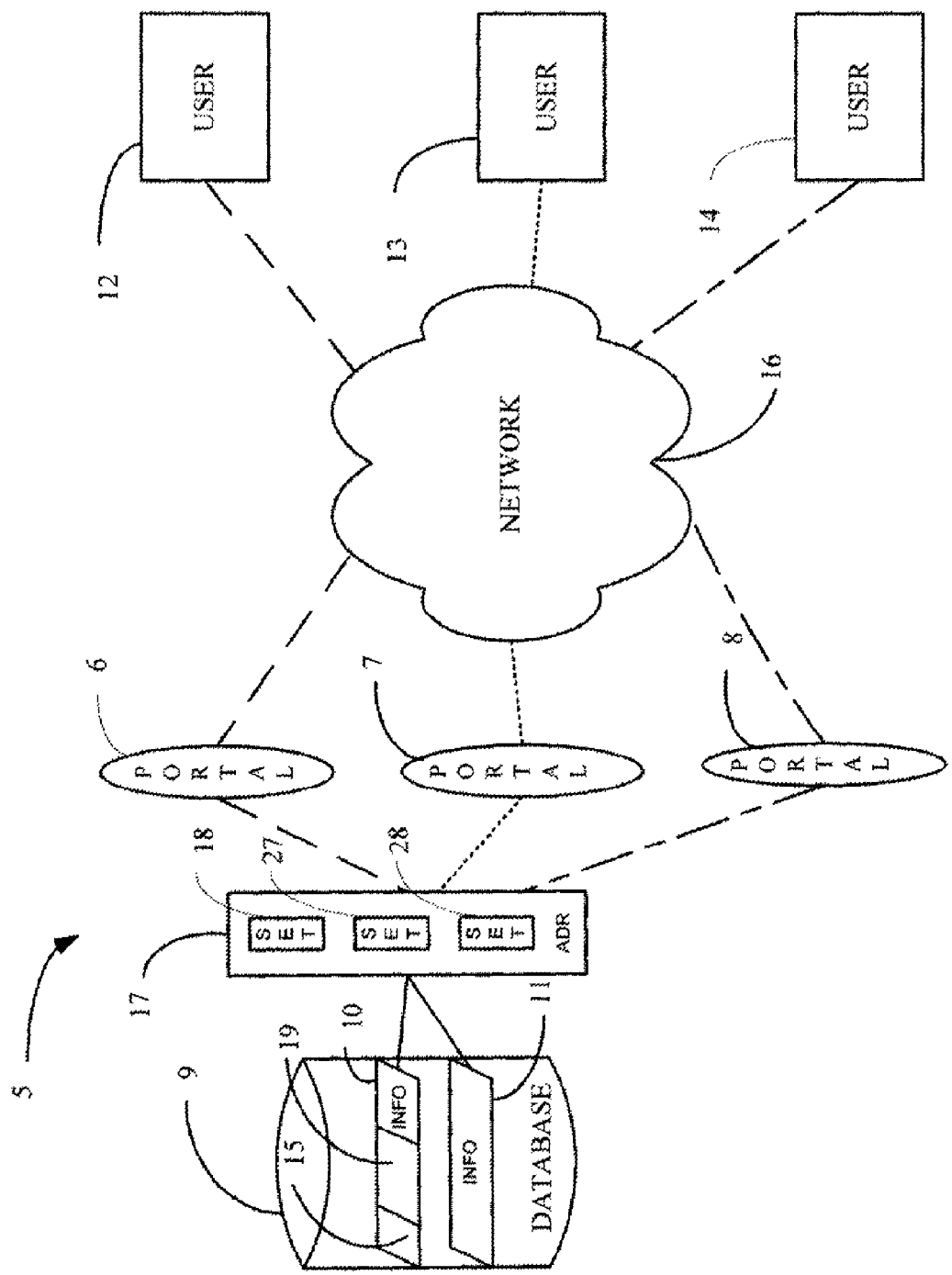
FIG. 1 illustrates a representative architecture for processing group membership data in a multi-tenant database system in accordance with one embodiment of the present invention.

FIG. 1 illustrates a database architecture 5 employing virtual portals 6, 7 and 8 in an MTS architecture that affords access to a database 9 having tenant information 10 and 11, associated with a tenant, by multiple users 12-14 over a data communication network 16. Architecture 5 includes information corresponding to more than one tenant, with the understanding that a tenant is an organization that obtains rights to store information on database 9 and make the same accessible to one or more users 12-14 to whom tenant provides authorization. This is typically achieved by rental agreements between the tenant and an owner/provider of architecture 5. In this manner, architecture 5 provides an on-demand database service to users 12-14 that are not necessarily concerned with building and/or maintaining the database system; rather, these functions are addressed between the tenant and the owner/provider. Tenant information 10 and 11 may include software applications, application data, and the like. Although information corresponding to two different tenants is shown, in practice information corresponding to any number of tenants may be present.

Each virtual portal 6, 7 and 8 provides an "instance" of a portal user interface, coupled to allow access to database 9. With architecture 5, multiple users 12-14 may access information on database 9 through a common network address, in this example a universal resource locator (URL). In response, web-pages and other content may be provided to users 12-14 over network 16. The resources of database 9 that users 12-14 may access can be different, depending on user's 12-14 security or permission level and/or tenant association. For example, in some MTSs, tenants may be allowed to provide users 12-14 associated with the tenant, referred to as tenant users, access to a sub-portion of the content of the database information that the tenant may be allowed to access. The sub-portion that anyone of the tenant users may access may be the same as or different from the sub-portion that the remaining tenant users may access. User's not associated with a tenant would not be allowed access to the tenant information. For example, assume users 12 and 13 are associated with the tenant corresponding to tenant information 10 and not associated with the tenant corresponding to tenant information 11. Users 12 and 13 would not be allowed access to tenant information 11 and would be allowed access to tenant information 10 or a sub-portion thereof. In the present example user may be allowed access to a portion 15 of tenant information 10 and user 13 may be allowed access to a portion 19 of tenant information 10, which is mutually exclusive. Similarly, were user 14 associated with the tenant corresponding to tenant information 11 and not the tenant corresponding to tenant information 10, user 14 would be allowed to access tenant information 11, or a portion thereof, and not tenant information 10. It is possible, however, that one of users 12-14 are associated to the tenants corresponding to both sets of tenant information 10 and 11. As a result, a tenant may be considered a group having one or more users 12-14 associated therewith.

Data communication network 16 may be any network or combination of networks of devices that communicate with one another. For example, network 16 can be anyone or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol. As a result, users 12-14 may access the corresponding tenant information 10 and 11 from any location where network access is available.

To this end, virtual portals 6, 7 and 8 facilitates providing resources of database 9 that a tenant may provide to users 12-14 associated with the tenant. Each user 12-14 logs into one of virtual portals 6, 7 and 8 to access resources of database 9 through a unique uniform resource locator (URL) or other type of address. Based on the URL and other identifying information associated with users 12-14, architecture 5 may determine the resources of database 9 users 12-14 may access. For example, user 12 communicates with database through virtual portal 6, user 13 communicates with database 9 through virtual portal 7, and user 14 communicates with database through virtual portal 8. It is possible, however, that all users 12-14 may use a common portal, as well. To that end, users desiring to access resources of database 9 employ virtual portals 6, 7 and 8 to validate against the information stored on system 5, corresponding to the user 12-14 requesting access to a sub-portion of content on database 9.

An example of a tenant may be a company that employs a sales force where each salesperson uses server system 30 to manage their sales process, such as by a management representative of the tenant, e.g., Vice President of Sales, the Chief Executive Officer of the tenant and the like. In this fashion, architecture facilitates Customer Relations Management (CRM). Thus, one or more of users 12-14 may be a salesperson that maintains information that is applicable to that salesperson's sales process and is different from information related to other salespersons' sales process. An example of sales process data may include, without limitation, contact data, leads data, customer follow-up data, performance data, goals and progress data applicable to that salesperson's personal sales process. The sales process information may be stored in database 9. To facilitate management of this information, the tenant associated with the salesperson may restrict each salesperson access to specific sales process information. However, a tenant, or representative thereof based upon a contractual relation ship between the salesperson and the representative, may be able to view all sale process information for the salespersons associated with the tenant. An example of a contractual relationship is a managerial/supervisory relationship. The managerial relationship between the salesperson and the tenant representative may provide the representative with a higher permission level when compared to the permission level of the salesperson, because, inter alia, the tenant representative may be a manager/supervisor of the salesperson. Another contractual relationship may be the principle agent relationship wherein the tenant representative has no day-to-day management responsibility of the salesperson. Nonetheless, as the representative of the principle, e.g., the tenant, the representative may view all of the salesperson information, because the salespersons may be deemed to be merely agents of the tenant.

This is referred to as a hierarchical data structure in which users at one permission level, in this example the representative, may have access to applications, data, and database information accessible by a lower permission level user, in this example the salespersons, with the salesperson not having access to certain applications, database information, and data accessible by a user at a higher permission level, the representative. In this fashion, the representative may access all information that the tenants' user could access, in this example, salespersons; however, the tenant's user, in the present example a salesperson, is not necessarily allowed to access information of the representative. As a result, the representative is a sub-group of the tenant group. Similarly, an administrator of the architecture 5 may access and control all information available to each of the tenants, as well as the tenant users associated with each tenant. It is conceivable that other sub-groups may exist.

Figure 2:
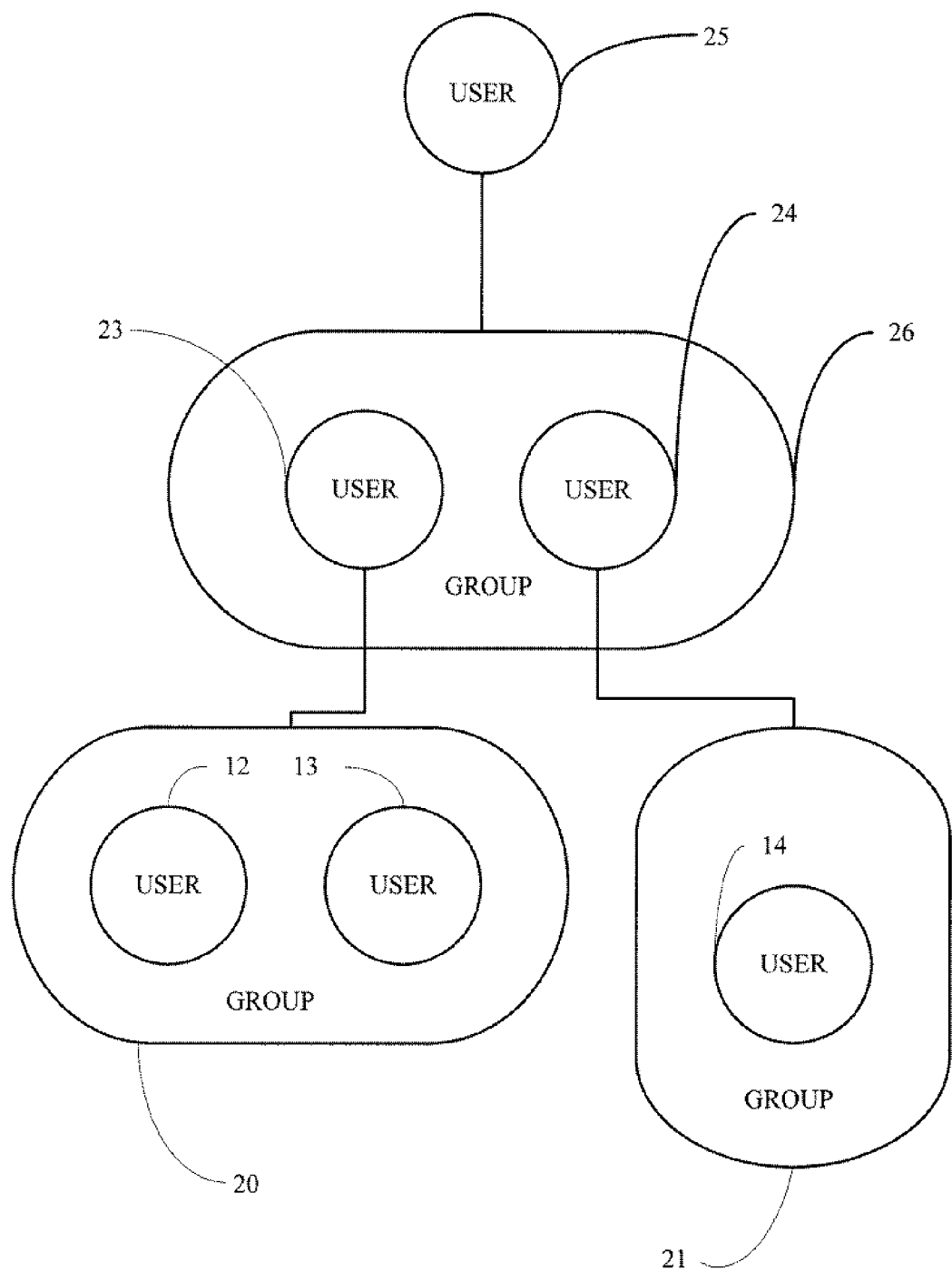
FIG. 2 is a simplified schematic view showing interrelationships between various groups and tenant representatives in accordance with the present invention.

Referring to FIG. 2, for example, a number of salespersons may be located in a geographic location which may be considered a geographic sub-group, which is shown as sub-groups 20 and 21. Sub-group 20 includes users 12 and 13, and sub-group 21 includes user 14. A representative of tenant, user 23, may have a managerial relationship with respect to users 12 and 13 by virtue of the association with sub-group 20, i.e., user may be the Vice-President of Sales for the geographic region corresponding to sub-group 20. Similarly, a representative of tenant, user 24, has a managerial relationship with respect to user 14 by virtue of the association with sub-group 21, i.e., user may be the Vice-President of Sales for the geographic region corresponding to sub-group 21. In addition, it may be seen that an additional user 25 has a managerial relationship with respect to users 23 and 24. As a result of the relation of user 25 to users 23 and 24, users 23 and 24 may be viewed as an additional sub-group 26 of the tenant. Thus, there exists an access authorization relationship (AAR) among sub-groups 26 and 20 and 21 such that any user having access to sub-group 26 also has access to both sub-groups 20 and 21. The AAR exists independent of the users associated with sub-groups 26, 20 and 21. However, the association of any given user with a managerial relationship is transitive in nature. The transitive nature of a user with a managerial relationship is a natural consequence of the business environment in which an individual user may change occupations within a given tenant and/or may become dissociated from a tenant. As a result, the individual user's right to access information based upon the managerial association may change.

Figure 3:
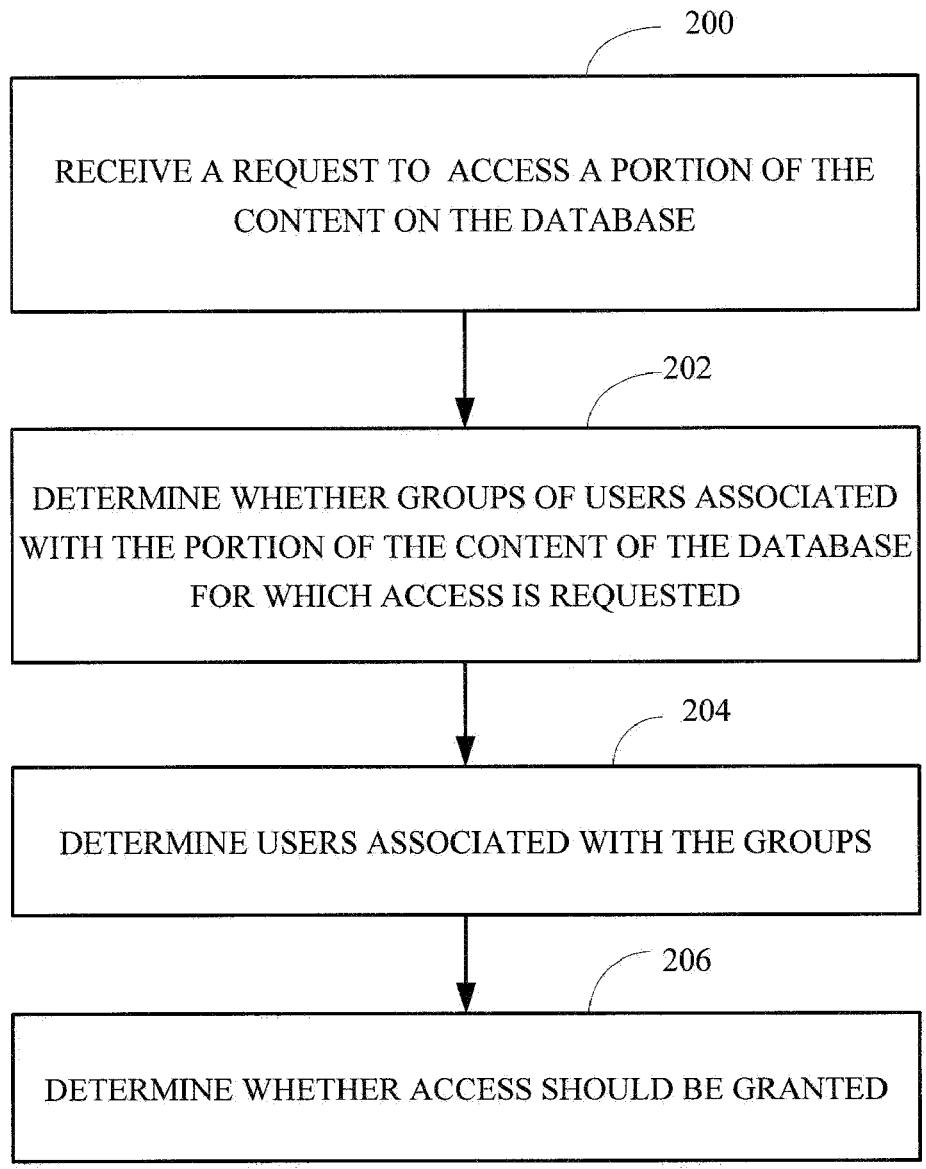
FIG. 3 is an operational flow diagram illustrating a high level overview of a method for controlling access to a multi-tenant database system using a virtual portal in one embodiment.

Referring to FIGS. 1, 2 and 3, in operation relational database management system (RDMS) or the equivalent may execute storage and retrieval of information against the database object(s). At step 200 a request is received from a user/tenant representative, such as 12-14 and 20-21 and 25, respectively, to access a portion of the content on database 9. The request includes identification information that is unique to the requesting user/tenant representative. In the present example, requests for access to content on database 9 is processed as a query during which database 9 determines groups of users associated with the portion of the content of database 9 for which access is requested, at step 202. The portion of the content of database 9 is referred to as an account. This is achieved employing associational data registry (ADR) 17 that includes a data set 18 associating groups, such as groups 20, 21 and 26 with the account. Following a determination of the groups associated with the account, the users associated with the groups are determined at step 204. Upon determining the users associated with the groups database 9 compares the identification of a user that provided the query with the users associated with the group to determine whether access should be granted at step 206. For example, assuming that users 12 and 13 are associated with a tenant corresponding to tenant information 10 and user 14 is associated with the tenant corresponding to tenant information 11. Requests for access to database 9 would be transmitted via virtual portals 6 and 7, respectively. In response to the request a sub-portion of tenant information 10, which is the subject of the request, is transmitted to users 12 and 13. Were it determined that the resources and content to be provided to users 12-14 was improper, in one embodiment architecture 5 would merely restrict this information from being made available to users 12-14. The remaining resources and content that is the subject of the request for access would be provided. The tenant and/tenant representative associated with the users 12-14 could be made aware that one or more of users 12-14 had attempted to access resources of database 9 that users 12-14 were not authorized to access. This may be achieved, for example, through owner/provider transmitting an e-mail message, an instant message, and/or a letter to the address of tenant. Of course, notification to the tenant by the owner/provider may be avoided altogether. Alternatively, were it determined that the resources and content to be provided to users 12-14 was improper, architecture 5 would restrict any resources of database 9 from being accessed by the users 12-14 requesting access, including resources and content that would otherwise be proper for the requesting user 12-14 to access. Notification to the tenant of the situation may or may not occur as discussed above.

Referring to again FIG. 1 to improve the operational characteristics of architecture 5 while providing the hierarchical data structure it is advantageous to organize the relationships, between groups and users, amongst multiple tables. This facilitates providing efficient processing of group membership data of the database by easing changes to the group membership and processing of queries to the data by maintaining acceptable number of processing cycles to respond to queries for access. To that end, ADR 17 includes two additional sets 27 and 28 of data. Data set 28 is a normalized data structure and associates individual members with groups. Data set 27 is a data structure in which the information contained therein is substantially independent of user-group association information. It was determined that the managerial relationships between different users of the database resulted in duplicative information being present in any given table. This resulted from having to maintain the AAR defined by managerial relationship and the transitive nature of the users associated with the managerial relationship. However, it is desired to maintain the AAR among the various sub-groups associated with a given tenant. Thus, information related to AAR is maintained in set 27, as well as information related to whether there exists transitive information with respect to sub-groups identified in set 27. With this data configuration a complete table concerning which user may access content on the database is obtained as a result of a join operation of sets 27 and 28 which produces a table that includes information concerning all users having access to the sub-portion of content on the database for which access is sought.

It should be understood that "table" and "object" may be used interchangeably herein. As a result, tenant information 10 and 11, as well as ADR 17, may be viewed as a collection of objects, such as a set of logical tables, containing data fitted into predefined categories. A "table" is one representation of a data object, and may be used herein to simplify the conceptual description of objects and custom objects according to the present invention.

Figure 4:
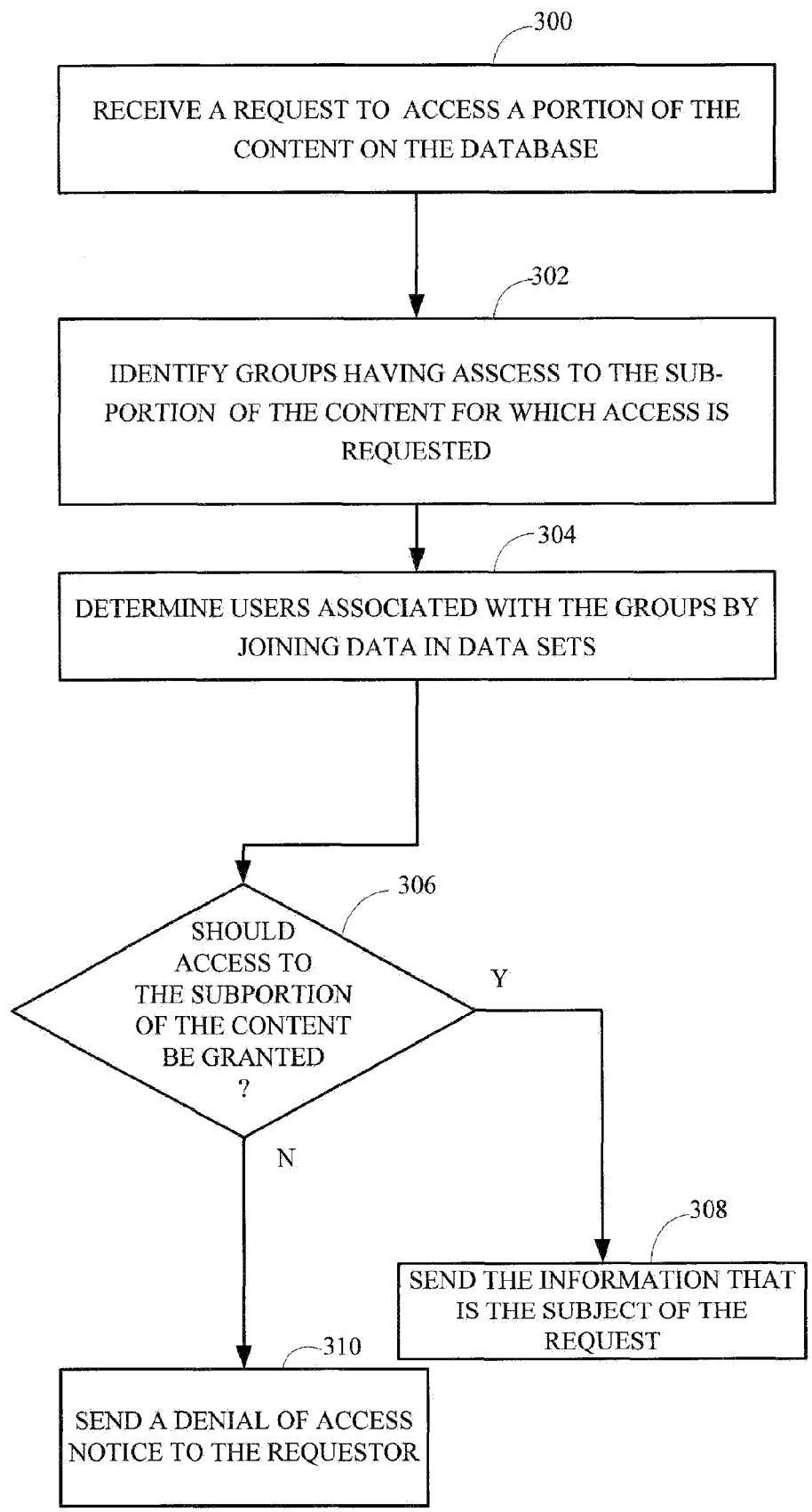
FIG. 4 is an operational flow diagram illustrating a high level overview of processing group membership in a multi-tenant database in accordance with a second embodiment of the present invention.

Referring to both FIGS. 2 and 4, another embodiment of the present invention includes step 300 during which architecture 5 receives, from a user, e.g., 10 a request to access a sub-portion of the content contained on data base 9. The request includes requester identification data. At step 302 groups having access to the sub-portion are identified. At step 304, the members associated with the groups are determined by joining data in sets 27 and 28. At step 306 a decision is made to determine whether the requester identification data corresponds to the member information. This is premised upon determining whether the user requesting access to the sub-portion is included in the users identified in step 304. If yes, then step 308 occurs during which the sub-portion is sent to the requester. If not, then step 310 occurs in which a denied access message is sent to the requester.

Figure 5:
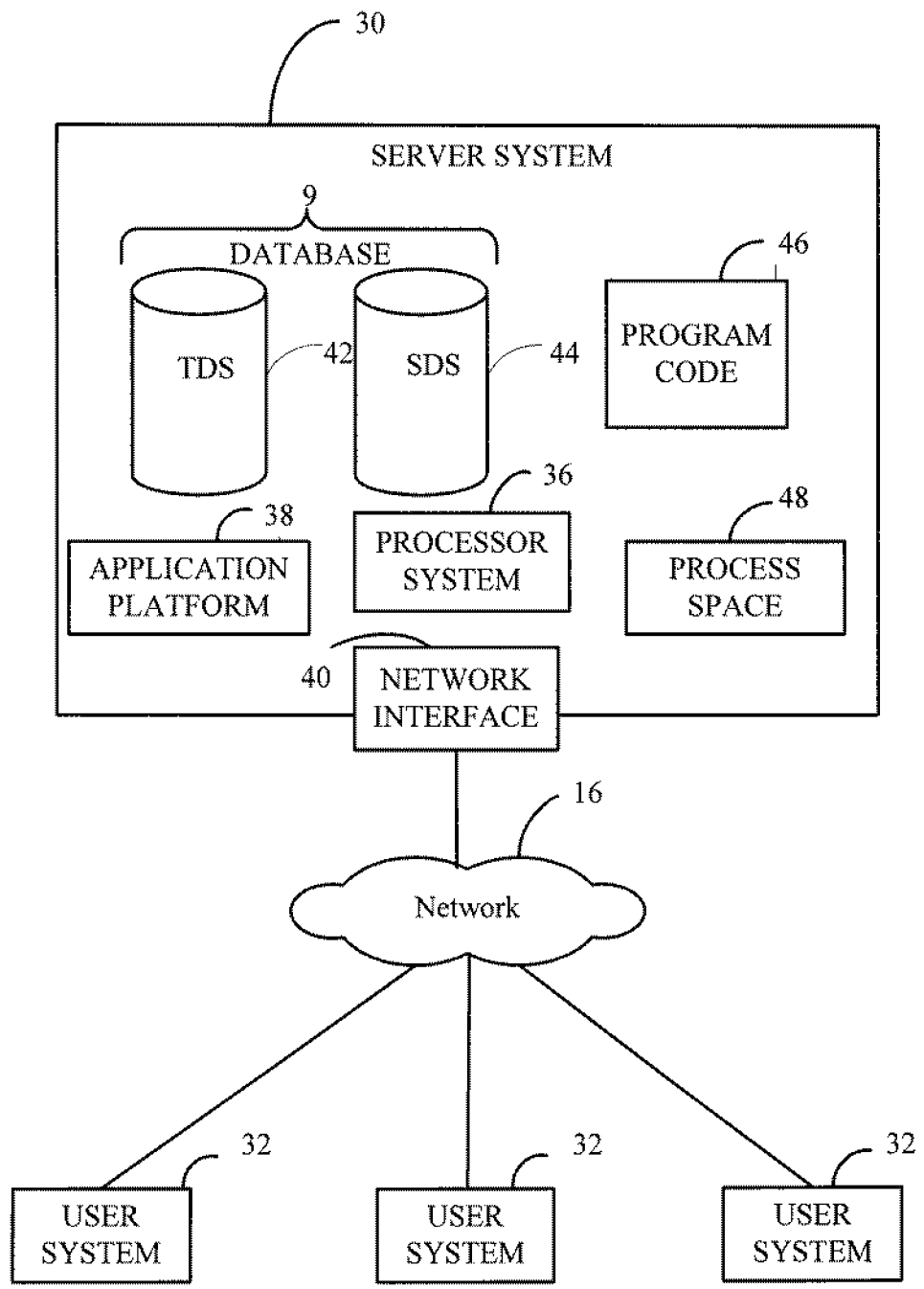
FIG. 5 illustrates a block diagram of an example of a representative system in which the architecture, shown in FIG. 1. may be practiced.
Figure 6:
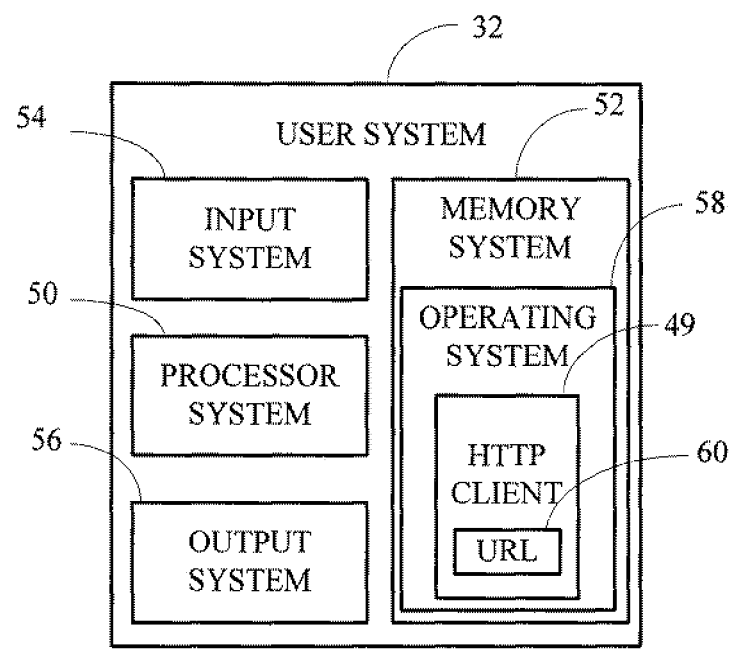
FIG. 6 is a detail block diagram of a user system, shown in FIGS. 1 and 5.

Referring to FIGS. 1, 5 and 6 a block diagram of a server system 30 employed to implement architecture 5 is shown as including multiple user systems 32 in data communication with server system 30 over network 16. Server system 30 includes a processor system 36, application platform 38, network interface 40, and database 9, which includes tenant data storage 42, system data storage 44. In addition server system 30 includes program code 46, and process space 48. Program code 46 may include, among other code, code to facilitate a tenant to control the look-and-feel of the experience users 12-14 have when accessing database 9. Process space 48 facilitates execution of MTS system processes and tenant-specific processes, such as running applications as part of an application hosting service. Additional processes that may execute on server system 30 include database indexing processes. In other embodiments, server system 30 may not have all of the components listed and/or may have other elements instead of, or in addition to, those listed above. Server system 30, and additional instances of an MTS, where more than one is present, and all components thereof may be operator configurable using applications including computer code to run using a central processing unit such as processor system 36, which may include an Intel Pentium® processor or the like, and/or multiple processor units.

Application platform 38 may be a framework that allows the applications of architecture 5 to run, such as the hardware and/or software, e.g., the operating system. In an embodiment, application platform 38 may enable creation, managing and executing one or more applications developed by the owner/provider of architecture 5, users 12-14 accessing architecture 5 via user systems 32, or third party application developers accessing architecture 5 via user systems 32.

In one embodiment, server system 30 implements a web-based customer relationship management (CRM) system. For example, in one embodiment, server system 30 includes application servers configured to implement and execute CRM software applications as well as provide related data, code, forms, webpages and other information to and from user systems 32 and to store to, and retrieve from, database system related data, objects, and Webpage content. Architecture 5 typically stores data for multiple tenants in the same physical database object, however, tenant data typically is arranged so that data of one tenant is kept logically separate from that of other tenants so that one tenant does not have access to another tenant's data, unless such data is expressly shared. In certain embodiments, server system 30 implements applications other than, or in addition to, the CRM application discussed above. For example, server system 30 may provide tenant access to multiple hosted (standard and custom) applications, including a CRM application. User (or third party developer) applications, which may or may not include CRM, may be supported by the application platform 38, which manages creation, storage of the applications into one or more database objects and executing of the applications in a virtual machine in the process space of server system 30.

To facilitate web-based CRM, user systems 32 might communicate with server system 30 using TCP/IP and, at a higher network level, use other common Internet protocols to communicate, such as HTTP, FTP, AFS, WAP, etc. To that end, user systems 32 may be any computing device capable of interfacing directly or indirectly to the Internet or other network connection, such as desktop personal computer, workstation, laptop, PDA, cell phone, or any wireless access protocol (WAP) enabled device and the like running an HTTP client 49. An example of a user system 32 includes a processor system 50, a memory system 52, an input system 54, and output system 56. Processor system 50 may be any combination of one or more processors. Memory system 52 may be any combination of one or more memory devices, volatile, and/or non-volatile memory. A portion of memory system is used to run operating system 58 in which HTTP client 49 executes. Input system 54 may be any combination of input devices, such as one or more keyboards, mice, trackballs, scanners, cameras, and/or interfaces to networks. Output system 56 may be any combination of output devices, such as one or more monitors, printers, and/or interfaces to networks. HTTP client 49 allows users 12-14 of users systems 32 to access, process and view information, pages and applications available to it from server system 30 over network 16. Examples of HTTP client 49 include various browsing applications, such as Microsoft's Internet Explorer browser, Netscape's Navigator browser, Opera's browser, or a WAP-enabled browser in the case of a cell phone, PDA or other wireless device, or the like. Access is gained to requisite tenant information 10 and 11 by entering the URL (not shown) into the URL box 60 of HTTP client 49. The URL directs users 12-14 to the appropriate virtual portal for to determine authorization and permission level to access the requisite tenant information.

Data corresponding with each user 12-14 may be separate from the data corresponding to the remaining users 12-14 regardless of the tenant associated with users 12-14; however, some data might be shared or accessible by a plurality of users 12-14 or all of users 12-14 associated with a tenant. Thus, there might be some data structures managed by server system 30 that are allocated at the tenant level while other data structures might be managed at the user level. Because an MTS typically support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, server system 30 might also maintain system level data usable by multiple tenants or other data. Such system level data might include industry reports, news, postings, and the like that are sharable among tenants.

According to one embodiment, server system 30 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
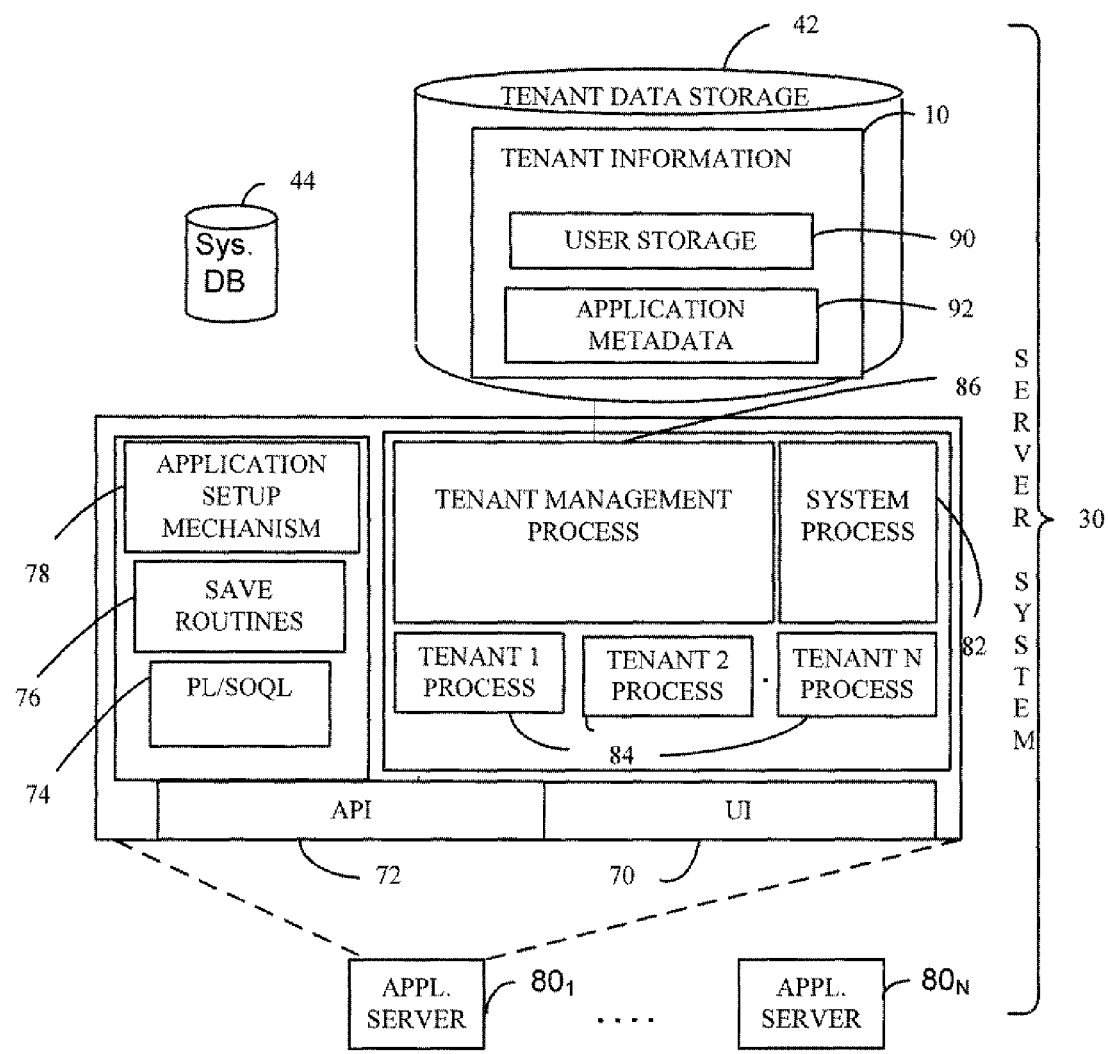
FIG. 7 illustrates a block diagram of an embodiment of elements of FIG. 5 and various possible interconnections between these elements.

Referring to FIG. 7, a specific embodiment of a server system 30 may include tenant data storage 42 and system data storage 44, which are as discussed above. In addition, server system 130 includes a user interface (UI) 70, application program interface (API) 72, PL/SOQL 74, save routines 76, an application setup mechanism 78, applications servers $80_1$-$80_N$, system process space 82, tenant process spaces 84, tenant management process space 86, tenant information 88, user storage 90, and application metadata 92. In other embodiments, server system 30 may not have the same elements as those listed above and/or may have other elements instead of, or in addition to, those listed above. Network interface is implemented as a plurality of HTTP application servers $80_1$-$80_N$. Also shown is system process space 82, including individual tenant process spaces 84 and a tenant management process space 86.

Referring to FIGS. 1, 5 and 7, each application server $80_1$-$80_N$ may be configured to service requests of user systems 32 for access to tenant data storage 42 and the tenant information 10, as well as data system storage 44. Tenant information 10 consists of different information storage areas that may physical differentiation, e.g., different hard disks, and/or a logical separation of the information. Within each tenant storage area 42, information may be included therein that consists of user storage 90 and application metadata 92 for each user or a groups of users. For example, a copy of a user's most recently used (MRU) items might be stored to user storage 90. Similarly, a copy of MRU items for an entire organization that is a tenant might be stored to an area of tenant data storage 42. UI 70 provides a user interface and API 72 provides an application programmer interface to server system 30 resident processes to users and/or developers at user systems 32. The tenant data and the system data may be stored in various databases, such as one or more Oracle™ databases.

Referring again to FIGS. 1, 5 and 7, it is not necessary that the one or more HTTP application servers $80_1$-$80_N$ be implemented as the sole network interface between server system 30 and network 16. Rather, other communication techniques might be used in conjunction with HTTP application servers $80_1$-$80_N$ or in lieu thereof In some implementations, the interface between server system 30 and network 16 includes load sharing functionality, such as round-robin HTTP request distributors to balance loads and distribute incoming HTTP requests evenly over a plurality of servers. At least as for users 12-14 one of HTTP application servers $80_1$-$80_N$, each of the plurality of servers has access to the MTS data; however, other alternative configurations may be used instead.

Application platform 38 includes an application setup mechanism 78 that supports application developers' creation and management of applications, which may be saved as metadata 92 by save routines 76 for execution by subscribers as one or more tenant process spaces 84 managed by tenant management process 86, for example. Invocations to such applications may be coded using PL/SOQL 74 that provides a programming language style interface extension to API 72. A detailed description of some PL/SOQL language embodiments is discussed in commonly owned co-pending U.S. patent application Ser. No. 11/859,498 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manage retrieving application metadata 92 for the subscriber making the invocation and executing the metadata as an application in a virtual machine.

Each HTTP application servers $80_1$-$80_N$ may be communicably coupled to database systems, e.g., having access to system data 34 and tenant data 32, via a different network connection. For example, one HTTP application server $80_1$ might be coupled via the network 16 (e.g., the Internet), another HTTP application servers $80_1$-$80_N$ might be coupled via a direct network link, and another one of HTTP application servers $80_1$-$80_N$ might be coupled by yet a different network connection. Transfer Control Protocol and Internet Protocol (TCP/IP) are typical protocols for communicating between HTTP application servers $80_1$-$80_N$ and database 9. However, it will be apparent to one skilled in the art that other transport protocols may be used to optimize the system depending on the network interconnect used.

In certain embodiments, each of HTTP application servers $80_1$-$80_N$ is configured to handle requests for any user associated with any organization that is a tenant. Because it is desirable to be able to add and remove application servers from the server pool at any time for any reason, there is preferably no server affinity for a user and/or organization to a specific one of HTTP application servers $80_1$-$80_N$. In one embodiment, therefore, an interface system implementing a load balancing function (e.g., an F5Big-IP load balancer) is communicably coupled between HTTP application servers $80_1$-$80_N$ and the user systems 32 to distribute requests to HTTP application servers $80_1$-$80_N$. In one embodiment, the load balancer uses a least connections algorithm to route user requests to HTTP application servers $80_1$-$80_N$. Other examples of load balancing algorithms, such as round robin and observed response time, also can be used. For example, in certain embodiments, three consecutive requests from the same user 12-14 could hit three different HTTP application servers $80_1$-$80_N$, and three requests from different user systems 32 could hit a common HTTP application server $80_1$-$80_N$. In this manner, server system 30 is multi-tenant, wherein server system 30 handles storage of, and access to, different objects, data and applications across disparate users and organizations.

In certain embodiments, user systems 32 (which may be client systems) communicate with HTTP application servers $80_1$-$80_N$ to request and update system-level and tenant-level data from server system 30 that may require sending one or more queries to tenant data storage 42 and/or system data storage 44. Server system 30 (e.g., an application server 80 in server system 30) automatically generates one or more SQL statements (e.g., one or more SQL queries) that are designed to access the desired information. System data storage 44 may generate query plans to access the requested data from the database.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, the present processes may be embodied as a computer program product that includes a machine-readable storage medium (media) having instructions stored thereon/in which can be used to program a computer to perform any of the processes of the embodiments described herein.

Computer code for operating and configuring the server system to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.). Therefore, the scope of the appended claims should be accorded the broadest interpretation so as to encompass all such modifications and similar arrangements.

The invention claimed is:

1. A system having at least a processor and a memory therein to execute instructions to process group membership data of a database system, wherein the system comprises:
    a portal user interface to allow users access to the database system over a network;
    the database system to store content;
    the database system to store the group membership data within a first dataset at the database system associating individual users as members of one or more groups or sub-groups;
    the database system to store Access Authorization Relationship (AAR) data within a second dataset at the database system, wherein the AAR data defines additional access rights for one or more users of a first sub-group to data which is accessible to one or more users of a second sub-group due to a managerial relationship between the one or more users of the first and second sub-groups;
    wherein the AAR data is independent of the group membership data stored by the first dataset which associates the individual users to the one or more groups or sub-groups and further wherein the AAR data exists independent of any individual users associated with the first and second sub-groups;
    the system to receive a request for access to a sub-portion of the content stored within the database system, wherein the request includes requester identification data uniquely identifying an individual user of the database system;
    the database system to determine the one or more groups and sub-groups having access to the sub-portion of the content stored at the database system;
    the database system to determine the users associated with the one or more groups and sub-groups via a join operation between the first dataset having the group membership data and the second dataset having the AAR data; and
    the database system to compare the identification of the user that provided the request for access to the sub-portion of the content with the users associated with the determined users associated with the one or more groups and sub-groups to determine whether access should be granted; and
    the portal user interface to transmit the sub-portion of the content in response to the request for access when determined that access should be granted.

2. The system of claim 1, wherein the portal user interface comprises:
    a plurality of virtual portals, each to provide an instance of the portal user interface, coupled to allow access to the database system on behalf of multiple users.

3. The system of claim 2, further comprising:
    architecture of the system providing access to the multiple users via the plurality of virtual portals to access information on the database system through a common network address.

4. The system of claim 3, wherein the common network address embodies a Universal Resource Locator (URL) through which web-pages and at least the sub-portion of the content stored within the database system is provided to the multiple users by the system depending on each of the multiple users' respective security or permission level and/or tenant association.

5. The system of claim 1:
    wherein a user of the first sub-group is a management representative of a tenant having information stored as the content within the system and wherein other users within the second sub-group are users of a lower permission level, wherein the users of the second sub-group are each salespersons of a salesforce employed by a company affiliated with the tenant having information stored as the content within the system;
    wherein each salesperson maintains information applicable to that salesperson's sales process and is different from information related to other salespersons' sales processes including any one or more of contact data, leads data, customer follow-up data, performance data, and goals and progress data applicable to that salesperson's personal sales processes; and
    wherein a manager of the salespersons of the salesforce employed by the company according to the contractual relationship of the user with other users within the group of the lower permission level is able to view all sale process information for all salespersons as part of the contractual relationship to effectuate a managerial/supervisory relationship with the salespersons.

6. The system of claim 5:
wherein the other users within the group of a lower permission level are each located in a geographic region defined as a geographic sub-group and wherein the other users within the group of a lower permission level have a managerial relationship with respect to the user of a higher permission level by virtue of an association with the geographic sub-group.

7. The system of claim 5:
wherein the contractual relationship of the user with other users within the group of a lower permission level is transitive according to a business environment in which an individual user's change to occupation within a tenant or disassociation from the tenant results in at least one of the users' right to access information based upon the contractual relationship changing corresponding to the change in occupation within the tenant or the disassociation from the tenant.

8. The system of claim 1:
wherein the system implements a web-based customer relationship management (CRM) system having a plurality of application servers therein, each configured to implement and execute CRM software applications as well as provide related data, code, forms, webpages, and the sub-portion of the content stored within the database system to and from a plurality of users of the system.

9. The system of claim 8:
wherein the system implements applications in addition to the CRM software applications to provide tenant access to multiple hosted standard and/or custom applications including the CRM software applications, user applications, and/or third party developer applications;
wherein the system manages creation and storage of the applications into one or more database system objects and executes the applications within a virtual machine inside a process space of the system.

10. The system of claim 1, further comprising:
a security mechanism to keep each of a plurality of tenants' data separate unless the data is shared or made accessible to the user of a given tenant subject to a contractual relationship of users of the first sub-group with users of the second sub-group.

11. A computer-implemented method to execute within a system having at least a processor and a memory therein to execute instructions for processing group membership data, wherein the method comprises:
allowing users access to the database system over a network via a portal user interface;
storing content at the database system;
storing the group membership data within a first dataset at the database system associating individual users as members of one or more groups or sub-groups;
storing Access Authorization Relationship (AAR) data within a second dataset at the database system, wherein the AAR data defines additional access rights for one or more users of a first sub-group to data which is accessible to one or more users of a second sub-group due to a managerial relationship between the one or more users of the first and second sub-groups;
wherein the AAR data is independent of the group membership data stored by the first dataset which associates the individual users to the one or more groups or sub-groups and further wherein the AAR data exists independent of any individual users associated with the first and second sub-groups;
receiving a request for access to a sub-portion of the content stored within the database system, wherein the request includes requester identification data uniquely identifying an individual user of the database system;
determining the one or more groups and sub-groups having access to the sub-portion of the content stored at the database system;
determining the users associated with the one or more groups and sub-groups by joining the first dataset having the group membership data and the second dataset having the AAR data; and
comparing the identification of the user that provided the request for access to the sub-portion of the content with the users associated with the determined users associated with the one or more groups and sub-groups to determine whether access should be granted; and
transmitting the sub-portion of the content in response to the request for access when determined that access should be granted.

12. The computer-implemented method of claim 11, wherein determining that access should be granted further includes generating a results table and ascertaining whether the requestor identification data matches an entry in the results table.

13. The computer-implemented method of claim 11, wherein an Associational Data Registry associates individual users with groups and organizes relationships between groups and users amongst multiple tables.

14. The computer-implemented method of claim 11, further comprising:
processing the request for access to the sub-portion of the content as a query, wherein query includes: (i) the determining the one or more groups and sub-groups having access to the sub-portion of the content stored at the database system, (ii) the determining the users associated with the one or more groups and sub-groups by joining the first dataset having the group membership data and the second dataset having the AAR data, and (iii) the comparing the identification of the user that provided the request for access to the sub-portion of the content with the users associated with the determined users associated with the one or more groups and sub-groups to determine whether access should be granted.

15. The computer-implemented method of claim 11, wherein the portal user interface comprises:
a plurality of virtual portals, each to provide an instance of the portal user interface, coupled to allow access to the database system on behalf of multiple users.

16. The computer-implemented method of claim 11:
wherein the sub-portion of the content of the database system for which access is requested is an account, and
wherein determining that access should be granted further comprises referencing an Associational Data Registry associating groups with the account.

17. The computer-implemented method of claim 11, further comprising:
determining that resources and/or content requested to be provided is improper and responsively restricting the resources and/or content requested from being made accessible to the requestor.

18. The computer-implemented method of claim 17, further comprising:
notifying an owner, provider, tenant, or other entity associated with the resources and/or content improperly requested of the improper request by transmitting an e-mail message, an instant message, and/or a letter.

19. Non-transitory machine-readable storage media having instructions stored thereupon for processing group membership data in a system having at least a processor and a memory therein, that, when the instructions are executed by the processor of the system, the instructions cause the system to perform operations including:

allowing users access to the database system over a network via a portal user interface;

storing content at the database system;

storing the group membership data within a first dataset at the database system associating individual users as members of one or more groups or sub-groups;

storing Access Authorization Relationship (AAR) data within a second dataset at the database system, wherein the AAR data defines additional access rights for one or more users of a first sub-group to data which is accessible to one or more users of a second sub-group due to a managerial relationship between the one or more users of the first and second sub-groups;

wherein the AAR data is independent of the group membership data stored by the first dataset which associates the individual users to the one or more groups or sub-groups and further wherein the AAR data exists independent of any individual users associated with the first and second sub-groups;

receiving a request for access to a sub-portion of the content stored within the database system, wherein the request includes requester identification data uniquely identifying an individual user of the database system;

determining the one or more groups and sub-groups having access to the sub-portion of the content stored at the database system;

determining the users associated with the one or more groups and sub-groups by joining the first dataset having the group membership data and the second dataset having the AAR data; and comparing the identification of the user that provided the request for access to the sub-portion of the content with the users associated with the determined users associated with the one or more groups and sub-groups to determine whether access should be granted; and transmitting the sub-portion of the content in response to the request for access when determined that access should be granted.

20. The non-transitory machine-readable storage media of claim 19, wherein determining that access should be granted further includes generating a results table and ascertaining whether the requestor identification data matches an entry in the results table.

* * * * *